UNITED STATES PATENT OFFICE.

OTTO THALLNER, OF BISMARCKHÜTTE, GERMANY, ASSIGNOR TO THE FIRM OF BISMARCKHÜTTE, OF BISMARCKHÜTTE, GERMANY.

REFINING OF STEEL IN ELECTRIC FURNACES.

No. 925,612.  Specification of Letters Patent.  Patented June 22, 1909.

Application filed June 17, 1908. Serial No. 439,044.

*To all whom it may concern:*

Be it known that I, OTTO THALLNER, metallurgist, a subject of the German Emperor, and resident of Bismarckhütte, in the Province of Upper Silesia, German Empire, have invented certain new and useful Improvements in the Refining of Steel in Electric Furnaces, of which the following is an exact specification.

This invention relates to the refining of steel in electric furnaces.

In my copending application Serial No. 439043 filed 17th June 1908 I have described a process of refining steel in which the steel, preferably previously refined in a fuel heated furnace, is passed to an electric furnace for the purpose of effecting a higher degree of refinement and allowed to settle in a crucible having an acid lining material.

Instead of employing a crucible, according to the present invention I employ an electric furnace lined with an acid lining such as a lining in which the principal ingredient is silicic acid.

In carrying the present process into effect the steel, preferably previously refined in a Martin-Bessemer or Thomas furnace, is treated in an electric furnace provided with a basic lining such as lime. In this furnace the refining is carried out to a high extent until the metal is perfectly free from carbon, manganese, silicon, phosphorus and sulfur. In this condition the metal contains not only considerable quantities of oxygen in the form of oxids but it possesses also the capability of taking up oxygen when coming in contact with the air during pouring. This unfavorable property can be avoided by carrying out the last stage of the process on an acid hearth. This end process that is the treatment in the acid lined electric furnace comprises removal of the oxids contained in the bath owing to the action of the acid hearth and then carbonization. Also the addition of alloys can take place in the acid electric furnace much more favorably than in a basic lined furnace. Such addition may be for example silicon, chromium, wolfram or nickel. By means of this combination of acid and basic electric furnaces it is possible to produce a product which possesses a perfectly compact structure with only the smallest possible content of manganese and carbon or with practically none of these constituents. The material to be treated can be run from one furnace to the other or can be carried over in suitable pots.

I claim:

1. A process for refining steel comprising the steps of refining the steel to a high extent in a basic lined electric furnace and then treating the same in an acid lined electric furnace, substantially as described.

2. The process for producing high quality steel consisting in preliminarily refining the steel in a fuel heated furnace, then passing the steel so refined for treatment in a basic lined electric furnace, after which the steel is passed to an acid lined electric furnace for the purpose set forth.

In witness whereof I have hereunto set my hand in the presence of two witnesses.

OTTO THALLNER.

Witnesses:
 ERNST KAHL,
 ERNST KATZ.